Patented Feb. 22, 1938

2,109,401

UNITED STATES PATENT OFFICE 2,109,401

AMINOALKYL-SULPHONIC ACIDS AND PROCESS OF PREPARING THEM

Otto Nicodemus and Walter Schmidt, Frankfort-on-the-Main-Hochst, Germany, assignors to General Aniline Works, Inc., New York, N. Y., a corporation of Delaware No Drawing. Application October 23, 1935, Serial No. 46,440. In Germany October 26, 1934

4 Claims. (Cl. 260—127)

The present invention relates to aminoalkyl-sulphonic acids and to a process of preparing them.

We have found that salts of dialkylether-disulphonic acids may be transformed easily and with a good yield into salts of the corresponding aminoalkyl-sulphonic acids by heating them with ammonia or a base containing nitrogen and bound to the nitrogen by a hydrogen atom capable of being exchanged. The reaction occurs according to the following scheme, the ether being split at the oxygen bridge:

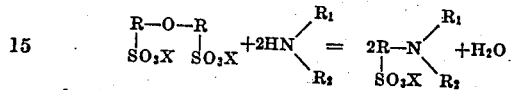

wherein X stands for the basic radical of the salt of the disulphonic acid,

R represents the same or different alkyl residues or substitution products thereof, $R_1$ and $R_2$ stand for hydrogen, alkyl, aralkyl, or aryl groups or the structure of a ring system as, for instance, in the case of piperidine, morpholine, piperazine, pyrrolidine or substitution products thereof, or $R_1$ stands for hydrogen and $R_2$ for OH or $NH_2$ (which may be substituted by alkyl or aryl radicals).

As bases containing nitrogen there may also be used, besides ammonia, for instance, hydroxylamine, hydrazine or a substituted hydrazine, such as phenylhydrazine or methylhydrazine; moreover, primary and secondary amines of the aliphatic, aliphatic-aromatic and aromatic series or substitution products thereof. There may be named, for instance, methylamine, butylamine, dodecylamine, cyclohexylamine, benzylamine, piperidine, piperazine, pyrrolidine, aniline, diethylamine, ethanolamine, ethylenediamine, chloraniline, and so on. As ether-disulphonic acids there may be named: diethyl-ether-beta,beta-disulphonic acid, dipropylether-disulphonic acid and dibutylether-disulphonic acid; the acids may be obtained in known manner from sodium sulphite and the corresponding dihalogen-dialkylethers.

The reaction between the salts of dialkyletherdisulphonic acids and the bases containing nitrogen commences even at a temperature below 100° C.; at a higher temperature it proceeds rapidly and completely. The addition of a fixed alkali may have a favorable influence on the reaction.

The invention provides an entirely new process for obtaining easily the aminoalkyl-sulphonic acids and their homologues and substitution products. These bodies are of industrial value, especially for the manufacture of auxiliary agents for the textile industry. Some of them could not hitherto be prepared or could be prepared only with great difficulty. Those among the aminoalkyl-sulphonic acids which are new products are characterized by the following general formula:

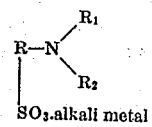

$SO_3$.alkali metal wherein R, $R_1$ and $R_2$ stand for alkyl, or $R_1$ stands for hydrogen and $R_2$ for hydrogen, OH, $NH_2$, alkyl, aryl, NH-alkyl or NH-aryl, R not being ethyl in case $R_2$ is hydrogen or methyl.

The following examples serve to illustrate the invention, but they are not intended to limit it thereto, the parts being by weight:

(1) 400 parts of sodium diethylether-disulphonate containing 28 per cent. of sodium chloride, obtainable by causing beta,beta-dichloro-diethylether to react completely with sodium sulphite, are heated for 5 hours at 230° C. to 232° C. under a pressure of 66 to 73 atmospheres above atmospheric pressure in an autoclave provided with a stirrer with 1100 parts of an aqueous methylamine solution of 36 per cent. strength in the presence of 30 parts of a caustic soda solution of 33 per cent. strength. After recovering the excess of methylamine, the solution yields on evaporation to dryness 410 parts of a product containing 56 per cent. of the sodium salt of methyltaurine and having a total content of nitrogen of 5.72 per cent. The product is treated with concentrated hydrochloric acid and the residue of the hydrochloric acid solution is recrystallized from dilute alcohol. The purified product thus obtained is identified as methyltaurine by its melting point which lies at 245° C. and is the same as that of a mixture of the product with pure methyl-taurine.

(2) 200 parts of technical sodium diethyletherdisulphonate are heated for 5 hours at 239° C. to 242° C. under a pressure of 31 to 33 atmospheres above atmospheric pressure with 200 parts of water, 20 parts of a concentrated caustic soda solution and 500 parts of aniline. The excess of aniline is expelled by steam-distillation and the aqueous solution is evaporated to dryness. There are obtained 291 parts of a product containing 56 per cent. of the sodium salt of phenyl-taurine.

(3) 200 parts of technical sodium diethylether-disulphonate are heated for 4½ hours at 239° C. to 241° C. under a pressure of 50 to 54 atmospheres above atmospheric pressure with 200 parts of water, 20 parts of a concentrated caustic soda solution and 400 parts of an aqueous dimethylamine solution of 49 per cent. strength. After distillation of the excess of dimethylamine and evaporation of the reaction solution there are obtained 232 parts of a product which contains the sodium salt of dimethyltaurine in a quantity representing a good yield.

(4) 95 parts of a technical salt containing 65% of sodium diethylether-alpha,alpha'-disulphonate, obtainable by causing alpha,alpha'-dichlorodiethylether to react with sodium sulphite, are heated with 300 parts of a methylamine solution of 40 per cent. strength for 3½ hours at 220° C. under a pressure of 54 to 58 atmospheres above atmospheric pressure in an autoclave after addition of 5 parts of caustic soda solution of 33% strength. The reaction product contains on evaporation to dryness 2.6% of nitrogen which corresponds with a content of 29.9% of sodium alpha-methyl-amino-ethanesulphonate.

(5) 45 parts of sodium ethylisopropylether-beta,beta'-disulphonate of 66% strength (obtainable from beta,beta'-dichloroethyl-isopropylether) are heated for 4 hours at 215° C. to 220° C. under a pressure of 32 to 34 atmospheres above atmospheric pressure with 350 parts of an aqueous solution of butylamine of 80% strength. The solution is evaporated and the residue contains a mixture of sodium butylamino-ethane-sulphonate and sodium butylamino-isopropanesulphonate with a content of nitrogen of 3.94 to 4.12%.

(6) 31 parts of sodium ethylisobutylether-beta,beta'-disulphonate of 65% strength are heated for 5 hours at 218° C. to 223° C. under a pressure of 42 to 49 atmospheres above atmospheric pressure with 200 parts of a methylamine solution of 40% strength and 2 parts of caustic soda solution. The solution of the reaction yields on evaporation a mixture of sodium methylamino-ethanesulphonate and sodium methylamino-isobutanesulphonate, the analysis of which shows a content of 2.27% of nitrogen.

(7) 200 parts of a sodium diethylether-beta,beta'-disulphonate of 70% strength are heated for 4½ hours at 220° C. to 230° C. under a pressure of 32 to 45 atmospheres above atmospheric pressure with 600 parts of concentrated aqueous ammonia after addition of 10 parts of caustic soda solution.

After evaporation of the solution there are obtained 213 parts of a mixture of taurine and ditaurine containing 21.2% of sodium taurine and 33.7% of sodium ditaurine.

(8) 20 parts of sodium diethylether-beta,beta'-disulphonate of 70% strength are dissolved in water and heated, while stirring, to boiling for 6 hours in a reflux apparatus after addition of 2 parts of caustic soda solution with 30 parts of phenylhydrazine. After cooling, the phenylhydrazine in excess is extracted with ether and the aqueous solution is evaporated to dryness. There are obtained 26 parts containing 3.34 to 3.42% of nitrogen.

(9) 17 parts of hydroxylaminehydrochloride in 100 parts of methylalcohol are mixed with 14 parts of sodium methylate whereupon the base is set free with formation of heat. After addition of an aqueous solution of 70 parts of sodium ethyletherdisulphonate the whole is slowly heated in an autoclave and kept at a temprature of 60° C. to 73° C. for 17 hours. After cooling, the solution of the reaction is evaporated to dryness in a steam bath; the residue contains 16.3% of sodium hydroxylaminoethanesulphonate.

(10) 29 parts of sodium dimethyletherdisulphonate of 47% strength, obtainable by causing symmetrical dichlorodimethylether to react with sodium sulphite, are heated for 5½ hours at 198° C. to 205° C. in an autoclave under a pressure of 38 to 46 atmospheres above atmospheric pressure with 200 parts of an aqueous methylamine solution of 40% strength. The distillation of the methylamine is followed by complete evaporation; the residue contains 18.2% of sodium methylaminomethanesulphonate.

We claim:

1. The process which comprises heating an alkali metal salt of diethylether-disulphonic acid with methylamine.

2. The process which comprises heating under raised pressure an alkali metal salt of diethylether-beta,beta'-disulphonic acid with ammonia in the presence of caustic soda solution.

3. The process which comprises heating an alkali metal salt of diethylether-disulphonic acid with aniline.

4. The process of preparing aminoalkyl-sulphonic acids which comprises heating alkali metal salts of dialkylether-disulphonic acids with nitrogen-containing bases which have at least one replaceable hydrogen atom attached to the nitrogen atom selected from the group consisting of compounds of the general formula

wherein $R_1$ stands for a member of the group consisting of H, alkyl, aralkyl and aryl and $R_2$ stands for a member of the group consisting of H, OH, $NH_2$, NH-alkyl, NH-aryl, alkyl, aralkyl and aryl.

OTTO NICODEMUS.
WALTER SCHMIDT.